Patented Dec. 25, 1951

2,579,836

UNITED STATES PATENT OFFICE 2,579,836

PRINTING INKS

Ernest D. Lee, Teaneck, Rupert J. Schefbauer, Jr., Union City, and Otto P. Berberich, Jersey City, N. J., assignors to Interchemical Corporation, New York, N. Y., a corporation of Ohio No Drawing. Application March 26, 1948, Serial No. 17,374

4 Claims. (Cl. 260—26)

This invention relates to printing inks, and aims to provide typographic and lithographic printing inks of the solvent-resin type characterized by extremely rapid drying under heat.

Typographic and lithographic printing inks were, until a short time ago, made almost exclusively from drying oils. Recently, however, drying oil inks have been largely replaced, particularly in the field of magazine printing, by inks of the type disclosed in Gessler United States Patent No. 2,087,190. The vehicles of these inks comprise essentially solutions of resinous binder in a solvent which is relatively non-volatile at ordinary room temperature (ca. 20° C.), but which volatilizes very rapidly from films when heated to temperatures of the order of 150° C., e. g. ethyl alcohol. The inks are ordinarily applied to paper and the like from conventional typographic printing presses, and the prints are then passed through ovens heated to 1000 to 2000° F. at such a speed that the paper does not exceed its scorching point. The solvent in the ink, which is substantially non-volatile at room temperature so that the ink remains stable on the press, vaporizes almost immediately from the thin films at the elevated temperatures, thus drying the inks.

The problem of lithographic printing with such heat drying inks, is complicated by the fact that lithographic printing is done by offsetting the inks onto a rubber or composition blanket, so that it becomes essential to find solvents which have no substantial effect on the blankets. Such inks are disclosed in Gessler United States Patent No. 2,285,430; the inks therein disclosed have vehicles which comprise resins dissolved in specially treated petroleum hydrocarbons which have the content of aromatic and unsaturated compounds reduced to a dimethyl sulfate value of 4 or less, and preferably to a dimethyl sulfate value of 1 or less.

In the formation of this type of ink for either typographic or lithographic printing, the choice of the resin is extremely important, since resins vary considerably in their solvent retention; thus, using the same solvent inks made from two different resins may dry at somewhat different rates. Furthermore, resins vary in solubility so that it may require more or less solvent to obtain a given body, and more or less solvent may have to be evaporated to get a film of the necessary dryness. In general, it has been the experience of the art in order to obtain the desirable drying characteristics, relatively expensive resins are necessary.

In E. D. Lee United States Patent No. 2,409,215, which issued October 15, 1946, inks of this type are described which employ resins derived from Utah coals, dissolved in petroleum hydrocarbons which are substantially non-drying at 20° C., and which evaporate rapidly at 150° C. These inks are relatively inexpensive yet dry as well as the best of the synthetic resins heretofore available.

In further work with these resins in printing ink, we have discovered how to produce ink vehicles from these Utah resins which dry more rapidly under heat than the inks made according to United States Patent No. 2,409,215.

Our new fast drying inks comprise dispersions of pigment in vehicles comprising solutions of certain modified Utah coal resins in petroleum hydrocarbons which are slow drying to substantially non-drying at 20° C., but which evaporate rapidly at 150° C. The modified Utah coal resins which are used in the ink vehicles of the present invention are obtained by reacting a solvent extracted Utah coal resin with an alpha, beta-ethylenically unsaturated polycarboxylic acid or anhydride and a polyhydric alochol. These modified resins and the process for preparing them are particularly described in the copending application of E. D. Lee et al., Serial No. 17,373, filed March 26, 1948, and now United States Patent No. 2,568,591.

For the purpose of the present invention the preferred modified coal resins are those obtained by reacting 100 parts of the coal resin with 5 to 15 parts of alpha, beta-unsaturated polycarboxylic acid or anhydride and 5 to 15 parts of polyhydric alcohol. Suitable unsaturated polycarboxylic acids and anhydrides include maleic anhydride, itaconic acid, citraconic acid, and fumaric acid. Suitable polyhydric alcohols that can be employed include all such polyhydric alcohols that are used in preparing alkyd resins, e. g. ethylene glycol, propylene glycol, glycerol, erythritol, pentaerythritol, mannitol, and sorbitol. It is preferred to react the coal resin with the alpha, beta-ethylenically unsaturated polycarboxylic acid or anhydride, then with polyhydric alcohol. However, the two reactants may be reacted with the coal resin simultaneously. It is preferred that the reactions be carried out at elevated temperatures of the order of 200° to 300° C. The following is a typical example.

To 100 g. of amber colored coal resin (melting point 160–164° C.) obtained by extracting resin concentrate from the froth flotation process with commercial hexane solvent, was added 12 g. of maleic anhydride and then the mixture was heated to 230° to 250° C. for one-half hour. Then 12 g. of glycerine was added and the temperature was maintained at 230° to 250° C. for another one-half hour. After cooling the reaction mass to room temperature a dark colored homogeneous solid was obtained. The capillary melting point of the solid resin was 187° to 190° C. as compared to 160° to 164° C. for the unmodified resin. The resin was soluble in aliphatic hydrocarbon solvents of type used in making heat drying inks to give solutions of high viscosity.

Typical examples of inks made in accordance with the invention are:

*Example I*

| | Parts |
|---|---|
| Stearine pitch | 2.2 |
| Carbon black | 15.8 |
| Lamp black | 2.2 |
| Talc | 3.0 |
| Paraffin wax | 2.60 |
| Resin varnish | 74.2 |

The resin varnish used in this example consisted of 47% solution of a modified coal resin (12 parts maleic anhydride, 12 parts glycerol, 100 parts coal resin of M. P. 160–164° C.) having a melting point of 187 to 190° C. by ring and ball method, in petroleum hydrocarbon (B. P. 245–259° C., kauri-butanol value 26, dimethyl sulfate value 2.5). The ingredients were mixed by grinding on a three roll mill in conventional manner.

*Example II*

This ink was similar to that of Example I except that the resin varnish consisted of a 47% solution of a modified coal resin of melting point 179–183° C., formed by reacting 100 parts of solvent extracted coal resin (melting point 160–164° C.) with 15 parts maleic anhydride and 15 parts glycerol.

*Example III*

This ink was similar to that of Example I except that the resin varnish consisted of a 45% of a modified coal resin of melting point 180–185° C. and formed by reacting 100 parts of solvent extracted coal resin (melting point 160–164° C.) with 12 parts itaconic acid and 12 parts of glycerol.

Similar inks have been prepared from resins wherein the solvent extracted coal resins have been modified 6 parts of unsaturated dicarboxylic acid and 6 parts of polyhydric alcohol, including glycols, per 100 parts of the coal resin. In each case the inks show new and improved drying characteristics over the unmodified coal resin. In press stability, as determined on a laboratory proving press, all of the inks were equal to or slightly better than a similar ink containing the unmodified coal resin. Also the gloss of the dried inks was in general slightly better than inks containing the unmodified coal resin.

In drying time tests on a laboratory heater, all of the new inks proved to be faster drying than the corresponding inks containing unmodified coal resin. In general, inks containing about 12 parts of unsaturated dicarboxylic acid and 12 parts of polyhydric alcohol per 100 parts of coal resin showed the greatest overall improvement over the inks containing the unmodified coal resin, and for this reason, they are the preferred resins for practicing the present invention.

In the practice of the present invention it is obvious that various additives that are conventional to the art can be added to inks made in accordance with the invention, without departing from the scope of the invention.

We claim:

1. A printing ink comprising pigment dispersed in a vehicle, which comprises a solution of a resin in a petroleum hydrocarbon which is slow drying to substantially non-drying at room temperature, but which volatilizes very rapidly at 150° C., the resin comprising a solvent extracted Utah coal resin modified by reaction with 5 to 15 parts of an alpha, beta-ethylenically unsaturated polycarboxylic acid and from 5 to 15 parts of a polyhydric alcohol per 100 parts of the coal resin.

2. A printing ink comprising pigment dispersed in a vehicle, which comprises a solution of a resin in a petroleum hydrocarbon which is slow drying to substantially non-drying at room temperature, but which volatilizes very rapidly at 150° C., the resin consisting of a solvent extracted Utah coal resin modified by reaction with 5 to 15 parts of maleic anhydride and 5 to 15 parts of a polyhydric alcohol per 100 parts of the coal resin.

3. A printing ink comprising pigment dispersed in a vehicle, which comprises a solution of a resin in a petroleum hydrocarbon which is slow drying to substantially non-drying at room temperature, but which volatilizes very rapidly at 150° C., the resin consisting of a solvent extracted Utah coal resin modified by reaction with 5 to 15 parts of maleic anhydride and 5 to 15 parts of glycerol per 100 parts of coal resin.

4. A printing ink comprising pigment dispersed in a vehicle, which comprises a solution of a resin in a petroleum hydrocarbon which is slow drying to substantially non-drying at room temperature, but which volatilizes very rapidly at 150° C., the resin consisting of a solvent extracted Utah coal resin modified by reaction with 5 to 15 parts of an alpha, beta-ethylenically unsaturated polycarboxylic acid and then with 5 to 15 parts of a polyhydric alcohol per 100 parts of the coal resin.

ERNEST D. LEE.
RUPERT J. SCHEFBAUER, Jr.
OTTO P. BERBERICH.

REFERENCES CITED

The following references are of record in the file of this patent:

UNITED STATES PATENTS

| Number | Name | Date |
|---|---|---|
| 2,039,243 | Krzikalla et al. | Apr. 28, 1936 |
| 2,327,596 | Erickson et al. | Aug. 24, 1943 |
| 2,327,597 | Erickson et al. | Aug. 24, 1943 |
| 2,336,983 | Erickson et al. | Dec. 14, 1943 |
| 2,336,984 | Erickson et al. | Dec. 14, 1943 |
| 2,344,194 | Anderson | Mar. 14, 1944 |
| 2,394,731 | Weber | Feb. 12, 1946 |
| 2,409,215 | Lee | Oct. 15, 1946 |

FOREIGN PATENTS

| Number | Country | Date |
|---|---|---|
| 12,807 | Great Britain | of 1884 |
| 115,149 | Australia | May 28, 1942 |

OTHER REFERENCES

Lee-Interchemical Review, vol. 6, pages 91–102, Winter 1947–48.